J. W. Pettengill,
Lifting Jack,
N° 52,596.  Patented Feb. 13, 1866.
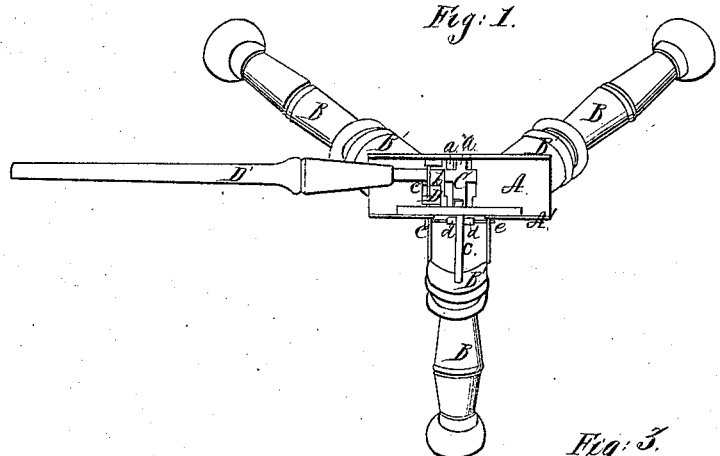
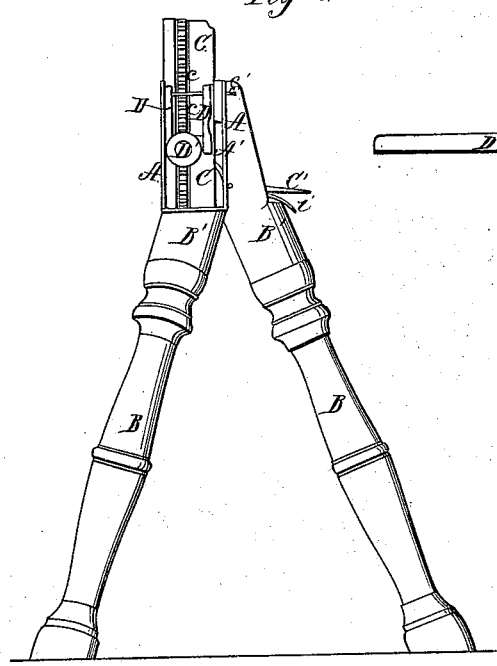
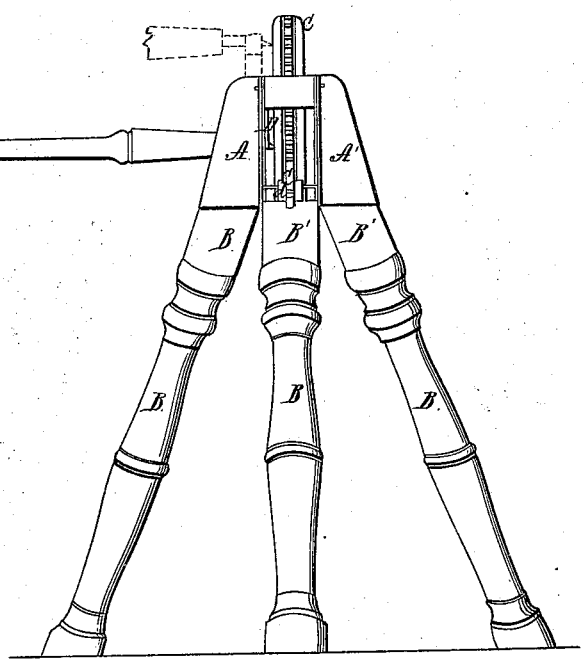
Witnesses:
J. Holmes,
A. W. McClellan
Inventor:
J. W. Pettengill

UNITED STATES PATENT OFFICE.

JOB W. PETTENGILL, OF ROCKFORD, ILLINOIS.

IMPROVEMENT IN LIFTING-JACKS.

Specification forming part of Letters Patent No. 52,596, dated February 13, 1866.

*To all whom it may concern:*

Be it known that I, J. W. PETTENGILL, of Rockford, in the county of Winnebago and State of Illinois, have invented certain new and useful Improvements in Lifting-Jacks; and I do hereby declare that the following is a full and complete description of the construction and operation of the same, reference being had to the accompanying drawings, making a part of this specification, in which—

Figure 1 is a top view. Fig. 2 is a side view. Fig. 3 is a front view.

Like letters of reference refer to like parts in the several views.

My improvement relates to a lifting-jack, as hereinafter described.

In the drawings, A is the head, which rests on legs B, by which it is supported. This head is formed of one piece, of the shape shown in the drawing, tapering from the bottom to the top, (seen in Fig. 3,) the sides A' being parallel with each other and having a space between them. From the head A project three sockets, B', into which the legs are inserted.

Between the two sides A' in the space is the slide C. From the back of this slide extend out flanges, that form a groove, a, which receives the guide a'. This guide is attached to or is a part of one side, A', of the head.

D is a link, that is hung to the head by a pin, c', passing through it and the sides A', as seen in Fig. 2. To this link the lever D' is pivoted or hinged, the head b of the lever being so as to work in the teeth c of the rack.

On three sides of the slide C is a rack. C' is a pawl that holds the rack in place. d d are lugs, (seen in Fig. 3,) through which a pin, e, passes, that the pawl C' rests on.

When the slide is raised as high as it can be with the link D turned down, as indicated, it can be raised by turning the link up in the position of the dotted lines in Fig. 3, and operating the lever in the same manner as when the slide is raised. The pawl has to be raised to support it, and this is done by removing the pin e and raising the pawl, putting the pin in the holes e', that the pawl will act in the rack above as it does in the position indicated below. The slide can then be raised by means of the lever, the head b working in the teeth c.

If desired, the link can be put on the other side of the slide, as it is sometimes necessary and more convenient in lifting, or two links and levers can be used, one on each side.

i is a spring under the pawl C', that aids in keeping it in place.

This machine may be applied to raising railroad rails and ties from the ground.

What I claim as my improvement, and desire to secure by Letters Patent, is—

The adjustable link D and pawl C', in combination with the slide C, lever D', and head A, the whole being constructed and arranged so as to allow the slide C to be raised to, or near to, the top of the head A by changing the pawl C' to the upper part of the head A and reversing the link D, substantially as set forth.

J. W. PETTENGILL.

Witnesses:
G. J. HITCHCOCK,
CHAS. S. SABIN.